Dec. 14, 1965  W. R. SNOOK, JR  3,223,366
CONTROL MECHANISM
Filed Jan. 30, 1964
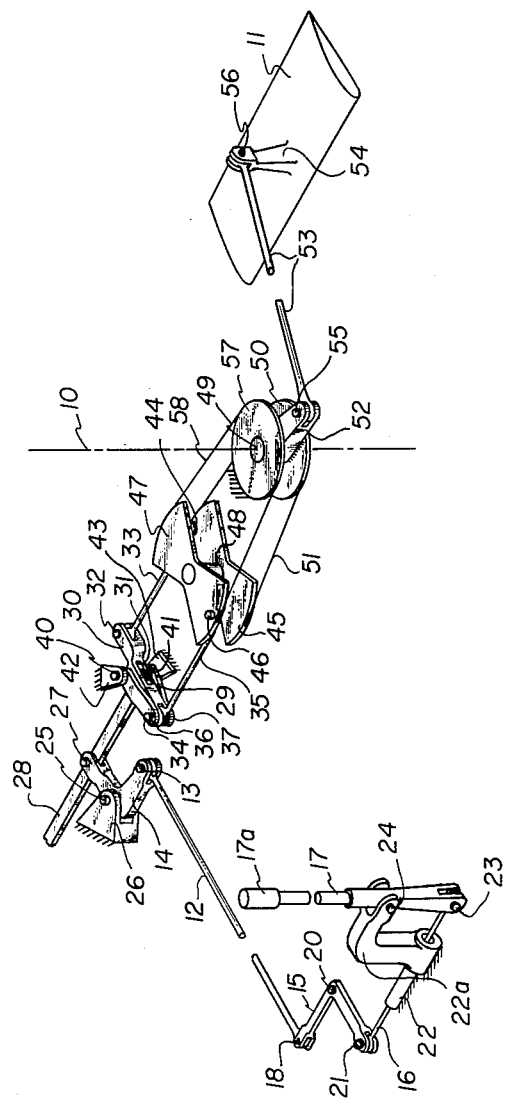
INVENTOR.
WILLIAM R. SNOOK, JR.
BY
ATTORNEY United States Patent Office 3,223,366
Patented Dec. 14, 1965

3,223,366
CONTROL MECHANISM
William R. Snook, Jr., 3908 E. Funston, Wichita, Kans.
Filed Jan. 30, 1964, Ser. No. 341,291
12 Claims. (Cl. 244—90)

This invention relates to a control mechanism. More particularly, this invention relates to a control mechanism for controlling from a remote position an element movably connected to a pivotally mounted member.

Heretofore, considerable difficulty has been encountered in providing suitable mechanical linkage for controlling from a remote position wing carried airfoils or control surfaces, such as ailerons, so that airfoils remain in a given position relative to the wing regardless of the angle of pivot of the wing, both during and after wing pivoting. Moreover, difficulty has been encountered in providing, in such an environment, complete linearity between incremental movement of a control stick and incremental movement of an airfoil, such as an aileron, throughout the full range of deflection of the control stick and the airfoil. In prior art linkages, the problem of providing for a smooth transition, during and after wing pivoting, has been magnified by the following requirements. A first requirement is that the airfoil, such as an aileron, maintain its given position relative to the wing at all times during and after pivotal movement of the wing. A second requirement is that the airfoil carried by the wing move substantially the same angular or linear incremental distance for a given angular or linear incremental deflection of a control stick at all times regardless of the pivotal movement or position of the wing.

It is therefore an object of this invention to provide a novel control mechanism embodying a mechanical linkage that substantially meets the above requirements.

Another object of this invention is the provision of a novel control mechanism comprising a mechanical linkage for controlling from a remote position an element movably connected to a pivotally mounted member, wherein the given position of the movable element relative to the pivotal member is continuously maintained during and after any pivotal movement of the member.

A further object of this invention is the provision of a novel control mechanism comprising a mechanical linkage inter-connecting an actuating member with an element movably connected to a pivotally mounted member, wherein the element will be moved substantially the same angular or incremental distance for a given angular or incremental deflection of the actuating member regardless of the relative pivotal movement or position of the member.

Another object of this invention is to provide a novel control mechanism comprising a mechanical linkage providing a simple and reliable pivot wing carried control surface operating mechanism operative throughout the full range of wing pivot adjustment and providing positive and substantially uniform control of the control surface regardless of the pivotal position of the wing.

Yet another object of the invention is the provision of a novel control surface control mechanism for a pivot wing whereby control effectiveness of the control surface is retained in all pivotal positions of the wing.

A still further object of this invention is the provision of a novel mechanism controlling the pivotal movements of a pivotal wing carried control surface whereby equal movements of an actuating member give substantially proportional movements of the operable control surface, such as an aileron, throughout the pivot range of the wing.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawing, which forms a part of this specification, and in which:

The drawing shows a pictorial sketch of a control mechanism embodying the invention.

It is to be understood that the invention is not limited to the details of construction and the arrangements of parts shown in the drawing and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to the drawing, reference numeral 10 indicates a pivot axis that for purposes of illustrating and describing the best mode of carrying out the invention, is shown to be a vertical pivot axis of a pivotally mounted member, such as that of a variable sweep aircraft wing. It is to be understood that the wing pivot axis 10 can be made substantially horizontal so that the wing can be rotated up and down for enhancing the lateral stability of an aircraft. Alternatively, the wing pivot axis 10 can be horizontal and disposed substantially parallel to the span of the wing so that the wing can be rotated about a substantially horizontal laterally extended axis such as may occur in vertical or short takeoff and landing, VTOL or STOL, type of aircraft. It is to be further understood, in addition to the above, that the wing pivot axis 10 can be oriented at any desired attitude in space without loss of effectiveness or utility of this invention. This invention is suitable for use, without loss of effectiveness or any of the advantages thereof, in any pivot wing aircraft requiring the manipulation of an element movably connected to the wing, such as an airfoil, control surface, or other element carried by the wing. The movable element will always retain its given position relative to the wing and remain operable throughout any pivotal movement given the wing and at all wing pivot positions. It is also to be understood that the wing may be on a submarine, an aircraft, a space vehicle, a land or water surface vehicle, or stationary or portable equipment.

For purposes of clarity in the description of applicant's invention, only the relevant structure of applicant's invention, only the relevant structure of applicant's novel linkage is shown with practically none of the extraneous structure of the pivotally mounted member or the structure carrying the pivotally mounted member being included in this specification or the drawing.

A movable pivot pin is herein defined as a pivot pin that does not have a fixed spatial location. A fixed pivot pin is herein defined as a pivot pin having a fixed spatial location. The pivot pins, whether fixed or movable, may, if desired, be adapted to pivot or to not pivot.

Referring to the drawing, the fixed pivot axis 10 defines a pivot axis for a variable sweep port wing of an airplane, not shown. The pivot axis of a starboard wing, not shown, would be substantially parallel with the port wing pivot axis 10 and laterally disposed on the starboard side of a conventional airplane fuselage. A movable element 11, preferably a port aileron, is movably connected to, and more specifically, pivotally connected to the port wing in a conventional manner, not shown. A control input push rod 12 is shown extending fore and aft of the aircraft fuselage, not shown, with its aft end pivotally connected by a movable pivot pin 13 to one arm of a bellcrank 14. The other end of a control input push rod 12 is, for purposes of illustration, connected via a bellcrank 15 and a transverse push rod 16 to an actuating member, such as a control stick 17 that may be pilot operated or automatic pilot operated in a known manner.

More particularly, the forward end of the control input push rod 12 is pivotally connected to one arm of the bellcrank 15 by a movable pivot or pintle pin 18. The bellcrank 15 is pivotally connected at the bight or midportion thereof, to the fuselage, not shown, with a fixed pivot or pintle pin 20. The other arm of the bellcrank 15 is pivotally connected to an outer end of the transverse push rod 16 by a movable pivot or pintle pin 21. The transverse push rod is slidably guided and supported at a midportion thereof in a sleeve 22 connected to the fuselage. The inner or other end of the push rod 16 is disposed within a clevis-like lower end of the control stick 17 and pivotally connected thereto by a movable pivot pin 23. The sleeve 22 is shown as fixed in the drawing for the purpose of illustration only. However, it is to be understood that the sleeve 22 can be journaled in a conventional manner so that the control stick 17 can be pivoted fore and after to effect pitch control of the aircraft through suitable conventional linkage means.

A handgrip 17a is provided at the upper end of the stick 17 for being grasped by an operator or pilot. By moving the stick from side to side, the transverse push rod 16 is moved to and fro in the sleeve 22. The sleeve 22 has a bellcrank-shaped support arm 22a extending upwardly and laterally to the port side for being pivotally connected to, and supporting a midportion of the control stick 17 by a fixed pivot pin 24. The upper end of the support arm 22a is clevis-shaped for straddling the control stick 17. It is to be understood that the control stick 17 is also generally used to control the elevators of the aircraft, but since this does not form a part of the embodiment being described, this additional control mechanism and linkage are not illustrated.

The bellcrank 14 is pivotally connected at the midportion thereof by a fixed pintle or pivot pin 25 to a fixed clevis 26 fixed to and carried by the aircraft fuselage, not shown. The other arm of the bellcrank 14 is pivotally connected by a movable pintle or pivot pin 27 to a midportion of a transverse slide or driver arm 28. The port side end of the slide arm 28 is pivotally connected by a movable pintle or pivot pin 29 to a midportion of a bellcrank 30. Preferably, the end of the slide arm 28 is disposed within a slot 31 formed in the mid-section of the bellcrank 30. The bellcrank 30 has its aft end pivotally connected by a movable pintle or pivot pin 32 to a driver intermediate push rod 33. The opposite or forward end of the bellcrank 30 is pivotally connected by a movable pintle or pivot pin 34 to a driven intermediate push rod 35 disposed parallel to the push rod 33. The end of the bellcrank 30 carrying the pin 34 is secured by a pair of symmetrically and oppositely disposed yoke-forming linkages 36 and 37 at the outer ends thereof. The pin 34 passes through the linkage 36, the bellcrank 30, the push rod 35, and the linkage 37. The opposite ends of the linkages 36 and 37 are respectively connected to coaxial fixed pintle or pivot pins 40 and 41 that are respectively carried by fixed support flanges 42 and 43. The flanges 42 and 43 are fixed to the fuselage of the aircraft.

The opposite ends of the intermediate push rods 33 and 35 are respectively pivotally connected to a movable pintle or pivot pin 44 carried by a driver quadrant 45, and a movable pintle or pivot pin 46 carried by a driven quadrant 47. The quadrants 45 and 47 are designed to independently pivot about a fixed pintle or pivot pin 48 having a vertical axis disposed parallel to the wing pivot axis 10.

When aileron input push rod 12 is shifted forwardly by tilting the grip 17a of the control stick 17 for left bank in a counter clockwise direction about the pivot pin 24 to the starboard side of the aircraft, the bellcrank 14 is caused to pivot in a clockwise direction about the pivot pin 25. The forward shifting of the push rod 12 results in the slide or driver arm 28 being driven laterally toward the port wing, which causes the bellcrank 30 and the driver push rod 33 to be moved laterally in the port direction. Accordingly, the intermediate push rod 33 drives the driver quadrant 45 in a clockwise direction about the pivot pin 48. Turning motion of the driver quadrant 45 transmits turning motion to a driven pulley or quadrant 50, the quadrant 45 being connected to the driven quadrant 50 by means of a cable 51. The cable 51 is looped around and preferably positively attached to the periphery of the driven quadrant 50 and has its ends fastened to the driver quadrant 45 in such a manner as to permit the cable to ride upon the arcuate peripheral portions of the quadrant 45. The driven quadrant 50 is preferably pivotally mounted on a pivot pin 49 with a center line of rotation coincidental with the pivotal axis 10 of wing sweep rotation. Angular clockwise motion of the driven quadrant 50 is imparted to the aileron 11, causing the aileron to tilt upwardly for a left bank through an integrally connected output crank 52 to an outpush push rod 53. The linear motion of the push rod 53 is then delivered to the aileron 11 via an actuating arm 54 fixed to the aileron 11. One end of the push rod 53 is connected to the crank 52 by a movable pintle or pivot pin 55. The opposite end of the push rod 53 is pivotally connected to the aileron actuating arm 54 by a movable pivot pin 56.

The aileron control element means, therefore, comprise the elements involved in transmitting motion from the control stick 17 to the aileron 11 via the push rod 12, the driver bar 28, the bellcrank 30, the driver rod 33, the driver segment 48, the cable 51, the driven segment 50, the driven crank 52, the output rod 53, and the aileron actuating arm 54.

Wing pivot feedback loop or wing sweep compensation control element means comprise a driver pully or quadrant 57, a cable 58, the driven segment 47, and the intermediate rod 35. The driver quadrant 57 is pivotally mounted on the pin 49 and rigidly connected to outboard wing structure so as to be driven by any movement of the wing through the same angular increment as the wing. Movement of the driver quadrant 57 drives the driven quadrant 47 via the cable 58. The cable 58 is looped about and preferably positively attached to the quadrant 57, and has the ends thereof attached to the periphery of the quadrant 47 in such a manner as to permit the cable 58 to ride on the contiguous arcuate peripheral portions thereof. Movement of the quadrant 47 is transmitted to the forward end of the crank 30 by the rod 35, causing the crank 30 to pivot about the pin 29. This changes the angular position of the crank 30 by changing the length of the moment arm between the pivot pin 34 and the longitudinal center line of the bar 28. The rods 33 and 35 are maintained substantially parallel to each other and therefore describe a parallelogram linkage pattern. The quadrants 45 and 47 have equal radii. Moreover, the quadrants 50 and 57 also have equal radii.

This compensating feedback movement to the crank 30 that is transmitted back through the rod 33, the driver quadrant 48, and the driven quadrant 50, causes the push rod 53 and the aileron 11 to maintain the positions thereof relative to the outboard wing structure regardless of wing pivot or sweep position.

It will be noted that the amount of feedback relative to the amount of wing pivot or sweep can be varied by altering the pitch diameters of the quadrants 50 and 57, which are equal in the preferred form disclosed herein. It is also to be understood that intentional aileron motion as a function of wing pivot or sweep can be accomplished if the quadrants 50 and 57 have different pitch diameters. The pulleys 50 and 57 are sheaves that have been referred to herein as quadrants and segments because it is not necessary in every instance that the pulleys 50 and 57 describe complete circles, but need only describe segments of a circle or quadrants. For example, a variable sweep wing is not likely to be swept more than seventy-five degrees. Accordingly, the pulley 57 need not describe the complete circle that has been shown in the drawing. This same reasoning also applies to the pulley 50 with respect to the aileron 11.

It will be noted that the invention, in its preferred form, provides only approximate linearity of movement between the control stick 17 and the aileron 11. There will be a slight increase of incremental or angular movement of the aileron per increment of stick movement as the stick 17 is moved away from neutral position, providing the rods 33 and 35 are perpendicular to each radius passing through the pivot pins 44 and 46, respectively, when the control stick 17 is in neutral position.

The control stick 17 is moved to the left in a counterclockwise direction as viewed from the front of the aircraft so as to cause the aileron or control surface 11 to tilt upwardly to effect a left bank of the aircraft. However, it is to be understood that by reversing either of the bellcranks 14 or 15, or by moving the horn 54 to the underside of the control surface 11, a movement of the control stick 17 to the left in a counterclockwise direction will result in the aircraft being banked to the right.

The invention disclosed is suitable for use where wing sweep is to be relatively large, for example sixty-five degrees. However, if wing sweep is to be small, for example twenty-five degrees, the quadrants 45, 47, 50 and 57 need not be used. See co-pending U.S. patent application S.N. 341,290 filed January 30, 1964 entitled "Control Mechanism" of William R. Snook, Jr.

It will be understood that this invention can be modified to adapt it to various circumstances and conditions, and it is accordingly desired to comprehend within the purview of this invention such modifications as may be considered to fall within the scope of the appended claims.

What is claimed is:

1. In an aircraft, pivotally mounted member means pivotal about a pivot axis, element means movably connected to said member means, remote control means controlling the position of said element means relative to said member means from a remote position, and feedback loop control means for accurately maintaining the position of said element means relative to said member means throughout a range of pivotal movement of said member means relative to the aircraft, and said remote control means and said feedback loop control means including, crank means, first means pivotally connected to said crank means, second means pivotally connected to said crank means, third means pivotally connected to said crank means for transmitting control input motion to said crank means and said first means, fourth means carried by said aircraft pivotally connected to said crank means, fifth means comprising a cable and pulley system pivotal about said pivot axis of said member means and pivotally connected to said first means, control motion transfer means connected to said fifth means and to said element means for transmitting control input motion from said first means to said element means, and sixth means comprising a cable and pulley system connecting said second means to said member means for feeding pivotal movement of said member means to said element means through said sixth means, said second means, crank means, said first means, said fifth means, and said control motion transfer means.

2. A control mechanism for controlling the position of element means movably connected to pivotally mounted member means comprising, remote control means for controlling the position of the element means relative to the member means, and feedback loop control means for accurately maintaining the position of the element means relative to the member means throughout a range of pivotal movement of the member means, and said remote control means and said feedback loop control means including, crank means, first means pivotally connected to said crank means, second means pivotally connected to said crank means, third means pivotally connected to said crank means for transmitting control input motion to said crank means and said first means, fourth means pivotally connected to said crank means, fifth means pivotally connected to said first means, control motion transfer means connected to said fifth means and the element means for transmitting control input motion from said first means to the element means, and sixth means comprising a cable and pulley system pivotally connected to said second means and the member means for feeding pivotal movement of the member means to the element means through said sixth means, said second means, said crank means, said first means, said fifth means, and said control motion transfer means.

3. A control mechanism as set forth in claim 2, wherein said range is approximately seventy-five degrees.

4. In an aircraft having at least one wing member pivotally connected to a fuselage and an aileron element movably connected to the wing member, a control mechanism for the element comprising, first crank means, first push rod means having one end pivotally connected to one end of said first crank means, second push rod means having one end pivotally connected to another end of said first crank means, transverse slide bar means having one end pivotally connected to said first crank means intermediate the ends thereof, said transverse slide bar means being adapted to receive element control input motion, yoke means pivotally anchored to the fuselage and said other end of said first crank means being pivotally connected thereto within the yoke thereof, first control motion transfer means pivotally connected to said first push rod means and to the aileron element for transmitting control input motion from said first push rod means to said aileron element, and wing member movement feedback means having a pivotally mounted first driven sector means pivotally connected to said second push rod means and having first driving sector means adapted to pivot with the pivotally connected wing member for feeding back pivotal movement of the wing member to said first driven sector means and said second push rod means.

5. In an aircraft as set forth in claim 4, wherein said first control motion transfer means has second driving sector means pivotally connected to said first driven sector means for independent pivotal movement relative thereto, said first push rod means being pivotally connected to said second driving sector means for driving the same, and second driven sector means pivotally connected to the wing member coaxially with said first driving sector means, and said second driven sector means being driven by said first driving sector means and adapted to transmit control motion and wing member movement feedback motion to the aileron element.

6. In an aircraft as set forth in claim 5, wherein said first control motion transfer means further comprises second crank means fixed to said second driven sector means, and third push rod means having one end pivotally connected to said second crank means and the other end operatively connected to the aileron element.

7. In an aircraft as set forth in claim 5, further comprising second crank means pivotally connected at one end thereof to said transverse slide bar means, said second crank means being pivotally supported by the fuselage, and third push rod means having one end pivotally connected to the other end of said second crank means.

8. In an aircraft as set forth in claim 7, further comprising, third crank means having one end pivotally connected to said third push rod means, said third crank means being pivotally supported by the fuselage, and fourth push rod means having one end pivotally connected to another end of said third crank means.

9. In an aircraft as set forth in claim 8, further comprising, lever means pivotally connected at one end thereof to said fourth push rod means, and slide guide means slidably supporting and guiding said fourth push rod means and having an arm pivotally connected to a midportion of said lever means.

10. A control mechanism for controlling the position of element means movably connected to member means pivotally supported by a frame comprising, remote control means for controlling the position of the element means relative to the member means, and feedback loop control means for maintaining the position of the element means relative to the member means throughout any pivotal movement of the member means, first lever means, bar means pivotally connected to a midportion of said first lever means, first push rod means pivotally connected to one end of said first lever means, support means pivotally connected to the other end of said first lever means at one end thereof and pivotally connected to and supported by the frame at the other end thereof, first pulley means pivotally supported by the frame means and pivotally connected to said first push rod means to be pivoted by the same, second pulley means pivotally supported by the member means, cable means drivingly connected to said first pulley means and to said second pulley means, and second lever means drivingly connected to said second pulley means and to the movable element for positioning the same relative to the member means responsive to movement of said bar means and said first lever means.

11. A control mechanism as set forth in claim 10, further comprising, second push rod means having one end pivotally connected to the other end of said first lever means, third pulley means pivotally connected to the frame coaxially with and independently of said first pulley means, said second push rod means being pivotally connected to said third pulley means in such a manner as to be driven by any pivotal movement of said third pulley means, fourth pulley means fixed to the member means coaxially with said second pulley means and coincidental with the pivot axis of the member means relative to the frame, and cable means drivingly connected to said third and fourth pulley means in such a manner that any pivotal movement of the member means is transmitted to said third pulley means from said fourth pulley means.

12. A control mechanism as set forth in claim 11, wherein said first and third pulley means are of equal effective diameter, said second and fourth pulley means are of equal effective diameter and said first and second push rod means are parallel.

References Cited by the Examiner
UNITED STATES PATENTS

| | | | |
|---|---|---|---|
| 2,646,234 | 7/1953 | Lindmalm et al. | 244—82 |
| 2,669,401 | 2/1954 | Bosserman | 244—82 |
| 2,985,408 | 5/1961 | Johnson | 244—90 |
| 3,133,716 | 5/1964 | Halliwell | 244—75 |
| 3,138,354 | 6/1964 | Baetke | 244—90 |
| 3,142,459 | 7/1964 | Baetke | 244—90 |

FERGUS S. MIDDLETON, *Primary Examiner.*

ANDREW H. FARRELL, MILTON BUCHLER,
*Examiners.*